United States Patent [19]
De Baer et al.

[11] Patent Number: 5,745,120
[45] Date of Patent: Apr. 28, 1998

[54] HIGH FIDELITY COLOR RENDERING METHOD AVOIDING MOIRE PROBLEMS

[75] Inventors: Dirk De Baer, Berchem; René Govaert, Kapellen, both of Belgium

[73] Assignee: Agfa-Gevaert N.V., Mortsel, Belgium

[21] Appl. No.: 646,712

[22] Filed: May 6, 1996

[30] Foreign Application Priority Data

May 5, 1995 [EP] European Pat. Off. .............. 95201169

[51] Int. Cl.$^6$ ...................................................... G03F 3/08
[52] U.S. Cl. ...................................................... 345/431
[58] Field of Search ................................. 345/431, 429, 345/432; 358/518, 522, 525, 504

[56] References Cited

U.S. PATENT DOCUMENTS

| | | | |
|---|---|---|---|
| 5,270,808 | 12/1993 | Tanioka | 358/527 |
| 5,307,182 | 4/1994 | Maltz | 358/518 |
| 5,317,426 | 5/1994 | Hoshino | 358/515 |
| 5,481,661 | 1/1996 | Kobayashi | 345/431 X |

*Primary Examiner*—Phu K. Nguyen
*Assistant Examiner*—Cliff N. Vo
*Attorney, Agent, or Firm*—Julie A. Krolikowski

[57] ABSTRACT

In order to achieve a larger color gamut, more colorants are used than the classical three chromatic colors cyan, magenta and yellow. The use of extra process colors, such as red or orange, green and blue, poses extra requirements on the screening process or on the color separation process. A method is described in which optimal color rendering is achieved by use of maximum three chromatic colorants at the same place only. In one embodiment particular sets of three chromatic colorants each cover color sub-gamuts which are disjunctive, allowing each input color to be located within one color sub-gamut. A set comprises no complementary colors.

4 Claims, No Drawings

HIGH FIDELITY COLOR RENDERING METHOD AVOIDING MOIRE PROBLEMS

DESCRIPTION

1. Field of the Invention

The present invention relates to devices and methods for HiFi color matching, in a process using more than three chromatic colorants. More specifically the invention is related to a printing process for which additionally to CMY or CMYK also Orange or Red, Green, Blue colorants may be used, such that at most three chromatic colorants are printed at the same location.

2. Background of the Invention

In order to achieve a larger color gamut for printed material, printing devices have been developed which use more than the three classic colorants: cyan (C), magenta (M) and yellow (Y), and in most cases additionally black (K). Printed material may be plain or glossy paper, on which printing inks (process colors) in an image wise fashion have been applied; or paper or transparent PET on which dyes have been deposited by a thermal process, such as thermo sublimation; or paper on which by ink jet printing a colored image is achieved; or plain paper on which by electrographic printing colored toner is deposited, e.g. by an electrophotographic printer such as the Chromapress (trade name) system, marketed by Agfa-Gevaert N.V. in Mortsel, Belgium. The color gamut achieved by these colorants (C,M, Y,K) is almost always more restricted than the color gamut of the real object to be reproduced by the printing process, and usually more restricted than the color gamut which is achievable on a color video monitor. Therefore, more chromatic colorants are added in the printing process. The most dramatic restriction of the color gamut is noticeable in the red colors. Therefore, red or orange is usually the first chromatic colorant which is added to the classic set of colorants. In the second place, also green colors are difficult to reproduce by merging appropriate amounts of cyan and yellow. Therefore, a green process ink or toner may be added to the set of basic colors. If another color may be added, usually blue is selected. Therefore, three so-called HiFi (High Fidelity) color systems are nowadays very popular:

1. CMYR: a combination of cyan, magenta, yellow and red
2. CMYOG: a combination of cyan, magenta, yellow, orange and green;
3. CMYRGB: a combination of cyan, magenta, yellow, red, green and blue.

To each of these three classes, black (K) may be added, in order to achieve pure black and deeper shadow tones. The CMYOGK set of Pantone under the trade name Hexachrome is a suitable HiFi color system.

Problems arise however if more than three chromatic components must be printed on top of each other. If, as is usual in the graphics art, contone images are halftoned in order to print them by traditional printing plates mounted on a e.g. an offset printing press, and if the halftoning method used is based on an amplitude modulation screening method according to an autotypical raster, moiré problems are likely to occur. This phenomena is discussed in more detail in U.S. Pat. No. 5,155,599. That patent shows how moiré problems can be eliminated when three colorants are used, which interfere with each other, but this method cannot solve the moiré problems caused by four inks interfering with each other. Important modifications to the screening angles may alleviate the problem, but nowadays people skilled in the art would prefer to select frequency modulation screening techniques, because such screens may be made completely moiré free. The problem here is however that a higher dot gain may occur, resulting in a discontinuous tone scale, or that the image looks more noisy. These drawbacks lead people skilled in the art back to autotypical rasters, for which HiFi colors can not be used because of moiré problems. There will thus be a trade off between a large color gamut, achieved by HiFi colors, and a suitable screening technique in order to avoid moiré or discontinuous tone scales.

FR-A-2 136 475 discloses a transformation of scanner device colours to reproduction device colours, the range of the latter being restricted and the device colour components being clipped to within that range.

EP-A-0 184 289 discloses a method for generating colour signals not only for C, M, Y and K, but also for a special colour such as brown (Br). The required amount of Br and the correspondingly corrected values for C, M, Y are derived from characteristic curves (C,M,Y) for Br.

U.S. Pat. No. 5,370,976 discloses a colour separation process, including metallic colours such as gold or silver.

DE-A-15 99 771 discloses a method for generating colour correction signals and colour separation signals basically within a CMY or CMYK system.

3. Objects of the Invention

It is therefore a first object of the invention to provide a method for reproducing a color image by more than three chromatic colorants, without the need for using special screening techniques.

It is a further object of the invention to provide a method, wherein the amounts of colorants to achieve a specific color are identified in a way as to achieve the best solution by a minimal computation effort.

Further objects and advantages of the invention will become apparent from the description hereinafter.

SUMMARY OF THE INVENTION

The above mentioned objects are realised by the specific features according to claim 1. Preferred embodiments of the invention are disclosed in the dependent claims.

A specific color may be given in a device dependent color space, such as an RGB space corresponding to a color scanner or a color video monitor, or such color may be given in a device independent color space, such as the CIE-Luv color space, defined by the Commission Internationale de l' Eclairage. A chromatic colorant is a colorant which is not black or white. These last two colorants are called achromatic colorants. Useful chromatic colorants for a HiFi color process are: cyan, magenta, yellow, red or orange, green and blue. The definition of these colorants is given in the table below according to the NEN 3012 standard (European colorscale for offset printing):

TABLE I

| Colorant | Trichromatic coordinates | | Luminance | Tolerance |
|---|---|---|---|---|
| | x | y | Y | ΔE |
| Cyan | 0.153 | 0.196 | 21.9 | 3.0 |
| Magenta | 0.464 | 0.232 | 17.1 | 5.0 |
| Yellow | 0.437 | 0.494 | 77.8 | 2.3 |
| Red | 0.613 | 0.324 | 16.3 | 7.3 |
| Green | 0.194 | 0.526 | 16.5 | 5.3 |
| Blue | 0.179 | 0.101 | 2.8 | 8.0 |

A colorant set is a set having one, two or at most three chromatic colorants. If the chromatic colorants are cyan, magenta, yellow and red (CMYR), then preferentially two colorant sets are defined: CMY and RMY. If the chromatic colorants are cyan, magenta, yellow, orange and green (CMYOG), as in the Hexachrome system, then preferentially three colorant sets are defined: CMY, OMY and CGY. If the chromatic colorants are cyan, magenta, yellow, red, green and blue (CMYRGB), then preferentially four colorant sets are defined: CMY, RMY, CGY and CMB. More generally, colorant sets are defined such that they contain no complementary colors. As is known in the art, red or orange is the complementary color of cyan, green is the compliment of magenta and blue is the compliment of yellow. It is also possible to define sets of two colorants, e.g. CM, but colors generated by this set may also be generated by the set CMY, with the yellow component set to zero. The same applies for a color set having just one color, e.g. C. All colors generated by that set, may be generated equally from the set CMY, by setting the magenta and yellow components to zero, i.e. taking the amounts of colorant zero.

Characterisation data are data that associate to specific combinations of amounts of colorants a color that is obtained by that combination. If e.g. 45% cyan, 15% magenta and 80% yellow (C,M,Y)=(45,15,80) are printed on top of each other, then a specific color is obtained, for which the trichromatic coordinates (x,y) and the luminance Y (x,y,Y) may be measured, in standardised conditions fixed by the CIE committee. Characterisation data associate thus (C,M,Y) with (x,y,Y). The abbreviation Y for both Yellow and the CIE luminance may be confusing, but from the context it is clear which is meant. If the colorant set is RMY, then other characterisation data are obtained, associating (R,M,Y) with (x,y,Y). This relation may be obtained in tabular form, or established as a set of mathematical equations or transformation. For each suitable colorant set, characterisation data are established. This may be done by effectively printing on the output system sheets with patches having different combinations of colorant amounts. These printed patches are then measured by a color densitometer, or colorimeter and the readings are converted to an appropriate color space, such as e.g. (x,y,Y).

By each colorant set, such as CMY and RMY, a specific color gamut may be achieved. It is very likely that colors within the first color gamut CMY are also present in the second color gamut RMY, which means that these color gamuts have overlapping portions. In order to make the process for finding the correct amounts of colorants to achieve a specific color unambiguous, each specific color gamut associated with a colorant set is reduced to a sub-gamut, such that no overlapping portions exist between the sub-gamuts of all suitable colorant sets.

Whenever a specific color is given, a process according to the current invention searches within a selected sub-gamut in order to find out whether that specific color belongs to that sub-gamut. If it is not found in that sub-gamut, and an indication is found that this color could belong to another sub-gamut, that other sub-gamut is searched accordingly. If the specific color is located within one sub-gamut, the characterisation data corresponding to that sub-gamut may be used to find out the amounts of colorants to be used in order to achieve the specific color on the printed output. These amounts of colorants may then be rendered by the output system on the output medium, which may be plain paper, glossy paper, transparent or opaque PET, specially coated paper, photographic paper for color prints etc.

It is clear that each specific color belongs to at most one sub-gamut, because the sub-gamuts are selected such that they are disjunctive. It is also possible that the specific color can not be reproduced by the chromatic colorants which are available in the printing process. In that case, amounts of colorants are identified that render a color which is as close as possible to the specific color. The term as close as possible is associated with a distance function. Such distance function may be just the Euclidean distance ΔE between the Luv coordinates of the rendered color and the Luv coordinates of the specific color, or that distance incremented by a lightness difference ΔL (taken always positive), multiplied by a constant factor a, and incremented by a hue difference ΔH, multiplied by a constant factor b. The factors a and/or b may be zero. Such a "distance" is also called an object function, which must be minimal in order to achieve the best match between the rendered color $C_R$ and the specific color $C_S$, the object function indicated by $G(C_R,C_S)$:

$$G(C_R,C_S)=\Delta L+a.\Delta L+b.\Delta H$$

In order to locate the specific color within one sub-gamut, one may start to search in the sub-gamut generated by the CMY set first. If a good solution $C_R$ is not found, and C is below a certain threshold level, then it may be appropriate to look in the color sub-gamut generated by the RMY colorant set. If M is below a threshold level, then CGY is searched preferentially; if Y is below a threshold level, then CMB is searched preferentially.

Colorant amounts which are found by this method make sure that at most three chromatic colorants will have amounts of colorants different from zero. The choice of the colorant sets such that complementary colors are excluded from the same set makes sure that never complementary colorants are printed on top of each other. This enables the use of autotypical rasters with traditional screening angles or screening angles according to the Agfa Balanced Screening technique (trade name of Agfa-Gevaert A. G. in Leverkusen, Germany) as described in U.S. Pat. No. 5,155,599. The same screening angle can be shared among complementary colors. If black has as screening angle of 45°, yellow of 0°, cyan of 15° and magenta of 75°, then a screening angle of 15° may also be used for the red or orange colorant, 75° for the green colorant and 0° for the blue colorant.

The amount of black (K) colorant is preferentially computed after the amounts of chromatic colorants are established. This way, at least the lightness value of the rendered color may be changed such that it approaches closer the specific color.

DETAILED DESCRIPTION OF THE INVENTION

The invention is described hereinafter by way of examples. While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appending claims.

We will first describe the method according to the current invention in the most general way. After that a concrete implementation will be discussed in detail.

First a colorant set is selected. Preferentially, therefore CMY is selected first. One must now find the (C,M,Y) colorant amounts such that the object function $G(C_R,C_S)$ is minimal, wherein $C_R$ is the color achieved by rendering the (C,M,Y) amounts of colorants, and $C_S$ is the specific color which should be reproduced. The rendered color $C_R$ is thus a function of the three colorant values (C,M,Y) and the color output system. Once the color output system has been characterised for the three chromatic colorants, the value of $C_R$ may be derived from (C,M,Y) by use of the characterisation data.

The values of (C,M,Y) will now be varied in a specific way, and each time the object function will be evaluated again to assess whether a more optimal value for the object function is achieved by an new set of (C,M,Y) values. Whenever a value for the object function is found that meets a pre-defined quality criterion, the search is stopped and the latest set of (C,M,Y) values is taken as a good set for approximation of the specific color. If after a number of iterations no set of (C,M,Y) values is found that meets the required threshold for the object function, then a new search may be started in other directions. The direction of a search is specified by a trihedron, defined by three orthogonal axes (T,N,B), defined in the CMY color space (or any other color space, according to the selected colorant set) associated with the current search stage. In a preferred embodiment, the orientation of the trihedron is taken parallel to the C,M,Y coordinate axes, such that T=C, N=M and B=Y. If the search started at $(C_0,M_0,Y_0)$ and ended after a fixed number of iterations at $(C_1,M_1,Y_1)$, then a new trihedron is selected, for which the T axis is parallel to the vector $(C_1,M_1,Y_1)-(C_0,M_0,Y_0)$. The N axis is orthogonal to the T axis and the B axis is orthonormal to both the T and N axis.

The orientation of the trihedron is decisive for how the search proceeds. If the trihedron coincides with the (C,M,Y) axes, then the search starts at $(C_0,M_0,Y_0)$. The object function G is evaluated and gives $G_0$. Then, a second point is selected, given by the coordinates $(C_0+\Delta C,M_0,Y_0)$, i.e. the search proceeds in the direction of the C axis, and evaluates the object function G in a point at a distance $\Delta C$, giving $G_0'$. If $G_0'$ is lower than $G_0$, then better colorant values have been found, and the new point is taken as start point. The increment $\Delta C$ is multiplied by a factor larger than 1, preferentially a factor 2. If the new point did not give a better object function value, then the search will proceed at the original point, and the increment $\Delta C$ is multiplied by a factor smaller than 1, preferentially a factor 0.5. The search now proceeds along the M axis over a distance $\Delta M$, which may be increased at success, and decreased if the object function gives a worse result. Next, the search proceeds along the Y axis, using a distance $\Delta Y$ accordingly. These steps are repeated for a fixed number of iterations or until a good object function value has been reached. If the last is not yet the case, another trihedron is taken, as described above. The steps of selecting a point in another direction is done in the same way, keeping track of an increment along the T axis $\Delta T$, an increment along the N axis $\Delta N$ and an increment along the B axis $\Delta B$. After a fixed number of iterations, another combination of colorant values may be found $(C_2, M_2, Y_2)$. If the good object function value is not yet achieved, then a new trihedron is defined, with the T axis parallel to $(C_2,M_2,Y_2)-(C_1,M_1,Y_1)$. Up to now, this process is comparable to the "Rosenbrock searching algorithm".

If somewhere in the process no better point can be found in the neighbourhood than the current point, then preferentially the process is started all over again, but with larger increments (e.g. $\Delta C$). The same starting point is taken, but the increments are doubled. In another start-over of the process, the increments are multiplied by a factor of four. We have found that this extension to the Rosenbrock scheme guarantees more that the real optimum combination of colorant amounts is found. This is due to the fact that local minima are present in the object function G, which keep a starting point and its derivatives within the neighbourhood of this local minimum, which may be not the minimum minimorum.

In what follows, the method will be described in more detail. A lot of the details may be departed from, without harming the advantageous effects of the current invention. Important is the selection of an object function and the choice of a preferentially orthogonal or even orthonormal but surely generating set of directions, along which the increments may be defined. A set of directions is generating, if the whole space (C,M,Y) may be reached by a combination of vectors along these directions. The process is described by the following steps:

I. Locating the specific color within a disjunctive color sub-gamut corresponding to a selected colorant set.

The procedure to achieve a specific color within a color sub-gamut corresponding to a selected colorant set is now described. This procedure works for any colorant set (e.g. CMY, RMY, OMY, CGY, CMB), no matter how many colorants are present in the colorant set. An important element in the procedure is the selection of a object function. This object function is best chosen to be continuous and discriminate all possible colorant amounts, if a specific color is given, in such a way that for a specific color the set of colorant amounts becomes totally ordered. An object function thus chosen avoids any indetermination in choosing the colorant amounts. However if the object function does not have this property the procedure will still result in a possible set of colorant amounts. The procedure steps will be exemplified with respect to the CMY colorant set. It must be clear that the same procedure may be applied to other colorant sets, such as those mentioned above.

Step 1

Start with any initial rendering amount of the colorants $(C_0,M_0,Y_0)$ in the selected colorant set CMY, and choose an orthonormal and generating set of directions in the space (C,M,Y) of rendering amounts of the selected colorant set. Also select for each direction C, M and Y in the chosen set of directions an initial step-size $\Delta C$, $\Delta M$ and $\Delta Y$. Furthermore select a required accuracy for the rendering amounts, a step-increase multiplication factor greater than 1, a step-decrease multiplication factor less than 1 and a maximum iteration count. Set the current iteration count to 1. Finally, choose an object function G, which is a relation that relates the specific color and every possible color in the sub-gamut to an object function value.

Step 2

Consider the chosen initial rendering amounts $(C_0,M_0,Y_0)$ as the best rendering amounts.

Step 3

For each direction in the chosen set of directions do the following:

3.1 From the best considered rendering amounts, take a step in the direction of size corresponding to this direction.

3.2 If the thus resulting rendering amounts are valid rendering amounts and the optimization target or object function yields a better result than the result related to the best considered rendering amounts, then replace the best considered rendering amount by the resulting rendering amount and increase the step-size chosen for the direction of the step-increase.

3.3 Otherwise, if in the thus resulting rendering amounts the object function does not yield a better result than the result related to the current best considered rendering amount, then either invert the direction if the step-size for the direction is positive, or invert the direction and decrease the step-size by multiplication with the step-decrease factor if the step-size for the direction is negative.

Step 4

Repeat step 2 until for each direction in the chosen set of directions, a successful step is followed by an unsuccessful step or until the required accuracy for the rendering amounts in all directions of the chosen set of directions is reached.

Step 5

Take the displacement-direction to be the direction that connects the best considered rendering amount and the initial rendering amount, and from now on take the initial rendering amount to be best considered rendering amount.

Step 6

If the in step 1 selected required accuracy of the rendering amounts is reached for each direction, increase the current iteration count with 1. If the current iteration count equals the in 1 selected maximum iteration count, then take the current best considered rendering amount as the specific color in the disjunctive color sub-gamut corresponding to the selected colorant set, and stop the algorithm. If the current iteration count is less than the selected maximum iteration count, then reset the set of directions (e.g. T, N, B) to the same directions started with in 1 (e.g. C,M,Y), take the same initial step-sizes as in step 1 for each direction in the set of directions but multiplied with the current iteration count, and restart with 2.

Step 7

If the in 1 selected required accuracy of the rendering amounts in not reached, then replace the selected set of directions by the set of directions resulting from orthonormalizing the multiplication of the displacement-direction and the selected set of directions, and repeat the procedure starting at step 2.

Method in the CMYOG case.

In the CMYOG case, the following three colorant sets are preferentially chosen: {C,M,Y}, {O,M,Y} and {C,G,Y}. The method works thus:

1. Choose an object function value and a threshold for each colorant.
2. Using the method described above, select colorant amounts for the colorant set {C,M,Y}.
3. If in the selected colorant amounts the cyan amount is below a threshold for cyan (this threshold is decisive for the delineation of the sub-gamuts), then select colorant amounts for the colorant set {O,M,Y} and see if it gives a lower result with respect to the object function value. If so, then take the colorant amounts in the {O,M,Y} set, else take the result of step 2.
4. If in the selected colorant amounts, the magenta amount is below a threshold for magenta (this threshold is decisive for the delineation of the sub-gamuts), then select the colorant amounts for the colorant set {C,G,Y} and see if it gives a lower result with respect to the chosen object function value. If so then take the colorant amounts in the {C,G,Y} set, else take the result of step 2.

Method in the CMYRGB case.

In the CMYRGB case the following four colorant sets are preferably chosen: {C,M,Y}, {R,M,Y}, {C,G,Y} and {C,M,B}. The method works thus:

1. Choose an object function value to be achieved and a threshold for each colorant.
2. Using the method described above, select colorant amounts for the colorant set {C,M,Y}.
3. If in the selected colorant amounts, the cyan amount is below a chosen threshold for cyan, then select colorant amounts for the colorant set {R,M,Y} and see if it gives a lower result with respect to the chosen object function value. If so, then take the colorant amounts in the {R,M,Y} set, else take the result of step 2.
4. If, in the selected colorant amounts, the magenta amount is below a chosen threshold for magenta, then select colorant amounts for the colorant set {C,G,Y} and see if it gives a lower result with respect to the chosen object function value. If so then take the colorant amounts in the {C,G,Y} set, else take the result of step 2.
5. If in the selected colorant amounts the yellow amount is below a chosen threshold for yellow, then select the colorant amounts for the colorant set {C,M,B} and see if it gives a lower object function result with respect to the chosen object function value. If so, then take the colorant amounts in the {C,M,B} set, else take the result of step 2.

Finally, a method is described to establish the amount of black ink (a-chromatic colorant), in order to achieve a good color match.

Method to add an a-chromatic colorant to a selection of colorant amounts for a specific color in a chromatic colorant set.

1. Calculate the lightness value for the selection of colorant amounts, using the characterisation data for the chromatic colorant set.
2. Add amounts of the a-chromatic colorant, staying within a range of allowable amount of a-chromatic colorant, until the lightness value of the resulting colorant amounts equals the required lightness value.

Having described in detail preferred embodiments of the current invention, it will now be apparent to those skilled in the art that numerous modifications can be made therein without departing from the scope of the invention as defined in the following claims.

We claim:

1. A method for rendering on a color output system a specific color by at least four chromatic colorants, comprising the steps of:

A. defining a plurality of colorant sets, each having at most three chromatic colorants;

B. establishing on said color output system, characterisation data for at least two colorant sets;

C. establishing for each said colorant set a corresponding color sub-gamut, disjunctive from each other color sub-gamut;

D. locating said specific color within one disjunctive color sub-gamut, corresponding to a selected colorant set;

E. rendering amounts of chromatic colorants according to said specific color and the characterisation data of said selected colorant set.

2. Method according to claim 2, wherein each defined colorant set comprises no complementary colors.

3. Method according to claim 1, wherein the step of locating is started in a sub-gamut corresponding to a CMY colorant set.

4. Method according to claim 1, wherein a same screening angle is used for screening at least two complementary color components.

* * * * *